United States Patent [19]

Grube et al.

[11] Patent Number: 4,736,687

[45] Date of Patent: Apr. 12, 1988

[54] WORKPIECE TRANSPORT SYSTEM

[75] Inventors: Erwin Grube; Gerhard Schilling, both of Bielefeld, Fed. Rep. of Germany

[73] Assignee: Durkoppwerke GmbH, Fed. Rep. of Germany

[21] Appl. No.: 903,261

[22] Filed: Sep. 3, 1986

[30] Foreign Application Priority Data

Sep. 4, 1985 [DE] Fed. Rep. of Germany ....... 3531550

[51] Int. Cl.⁴ ............................................ B65G 47/48
[52] U.S. Cl. ........................................ 104/88; 104/49; 104/100; 198/346.1; 198/349; 198/465.4; 29/33 P
[58] Field of Search ................. 198/346.1, 349, 465.4, 198/465.1, 465.2; 104/88, 49, 97, 99, 100, 252, 253, 172.4; 414/136; 29/33 P, 563

[56] References Cited

U.S. PATENT DOCUMENTS

| | | | |
|---|---|---|---|
| 618,396 | 1/1899 | Cowles | 198/465.4 |
| 2,853,955 | 9/1958 | Bishop et al. | 104/88 |
| 2,862,600 | 12/1958 | Burrows | 198/465.4 |
| 3,056,360 | 10/1962 | Burmeister et al. | 104/88 |
| 3,592,141 | 7/1971 | Davidson | 104/88 |
| 4,084,684 | 4/1978 | Skinner | 198/465.4 |
| 4,372,218 | 2/1983 | Ostlund | 104/88 |
| 4,580,705 | 4/1986 | Wolfson et al. | |
| 4,597,495 | 7/1986 | Knosby | 104/88 |
| 4,603,777 | 8/1986 | Pearl et al. | |
| 4,615,273 | 10/1986 | Osthus et al. | |
| 4,646,646 | 3/1987 | Swilley | 104/100 |

FOREIGN PATENT DOCUMENTS

| | | |
|---|---|---|
| OS1781310 | 1/1971 | Fed. Rep. of Germany . |
| PS2947745 | 6/1980 | Fed. Rep. of Germany . |
| 2399368 | 4/1979 | France .............................. 198/465.4 |

OTHER PUBLICATIONS

"Forderanlage mit Auswahlautomatik fur das programmgesteuerte Bereitstellen von Motoren und Achsen in der Automobil-Endmontage" ]Conveyor System with Automatic Selection for the Program Controlled Making Availabe of Engines and Axles in Automobile Final Assembly]; Siemens-Zeitschrift, vol. 45, No. 7 at 460 (1971).

*Primary Examiner*—Joseph E. Valenza
*Attorney, Agent, or Firm*—Ostrolenk, Faber, Gerb & Soffen

[57] ABSTRACT

A computer-controlled system for transporting workpieces, in which each workpiece is placed on a load carrier, each workpiece and load carrier being marked with an identifier. A central computer is loaded with data relative to each given workpiece, its respective load carrier, and work to be performed on such workpiece, and predetermines a path to be followed by such load carrier. The load carrier is placed on a main path, its identifier is read, and if work is to be performed on a workpiece carried thereon, a switch is thrown to divert the load carrier to an auxiliary path and then to a work station. The load carrier may be diverted to the work station by a swing-out device or by a spur path, for example. After such work, the load carrier is returned to the main path and its identifier is read again to determine whether it again is to be diverted to an auxiliary path for performing further work on a workpiece carried thereon. Holding devices are provided on the main and auxiliary paths for performing sorting and accumulating functions to optimize passage times around the system.

23 Claims, 6 Drawing Sheets

WORKPIECE TRANSPORT SYSTEM

BACKGROUND OF THE INVENTION

1. Field of the Invention

The present invention relates to a system for transporting workpieces and associated load carriers in manufacturing operations, and more particularly to a method and apparatus including main and auxiliary paths for the load carriers, and computer-controlled identifying, holding, and diverting devices for transferring load carriers from the main path to the auxiliary path and then to a work station, while optimizing the workpiece passage times around the system.

2. Description of the Related Art

An automatic workpiece transport and routing device is known (Federal Republic of Germany OS No. 17 81 310), which includes a power drag means and a conveyor, the load carriers which can travel on an endless main path being moved by the drivers provided at given distances apart on a continuously driven conveyor. Each load carrier has a respective coded address part which is scanned by scanning apparatus arranged alongside the main path. Beside the main path there are provided auxiliary paths over which the load carriers can travel via switchable switches. There are also buffer paths into which the load carriers are switched depending on their address code and, after the completion of the working of the workpiece carried by the load carrier, brought back into the main path. The known transport device has the following disadvantages:

1. Since one driver of the conveyor belt always moves only one load carrier, and as a result of the distance between each two drivers, intolerably long passage times result.
2. Since directly before the working of the workpiece transported by the load carrier said load carrier can neither be placed on or transferred from the auxiliary path, a simultaneous sorting operation is not possible during the working of the workpiece.
3. For the presorting of similar workpieces, a plurality of buffer paths will branch off from the main path and are arranged parallel to each other are provided in front of the work station, as a result of which the known device takes up a very large amount of space.

A principal object of the present invention is to provide a method by which shorter passage times during the course of manufacture can be obtained while, at the same time, the sorting of workpieces which have still not been worked can be carried out during the working of a given workpiece. A further object is to provide an apparatus for carrying out the method which takes up a minimum amount of space.

This object is achieved in a computer-controlled system in which each workpiece is placed on a load carrier, each workpiece and load carrier being marked with an identifier. A central computer is loaded with data relative to each given workpiece, its respective load carrier, and work to be performed on such workpiece, and predetermines a path to be followed by such load carrier. The load carrier is placed on a main path, its identifier is read, and if work is to be performed on a workpiece carrier thereon, a switch is thrown to divert the load carrier to an auxiliary path and then to a work station. The load carrier may be diverted to the work station by a swing-out device or by a spur path, for example. After such work, the load carrier is returned to the main path and its identifier is read again to determine whether it again is to be diverted to an auxiliary path for performing further work on a workpiece carried thereon. Holding devices are provided on the main and auxiliary paths for performing sorting and accumulating functions to optimize passage times around the system.

By the computer-assisted method of the invention it is now possible, for the desired shortening of the passage times, to assure an optimized flow of material to the individual work stations which substantially eliminates non-productive downtimes, the pieces of material to be worked being presented to the operator in optimal ergonomically favorable position for grasping, relative to the work center of each working station. For this purpose, the apparatus for the carrying out of the method permits automatic sorting, adapted to specific requirements, in the immediate vicinity of the corresponding work station, as well as the delay-free removal from said work station of the workpiece which has been worked. The computer-assisted method furthermore also permits the preferred working of rush orders and other special jobs by priority criteria stored in the central management computer, considerable efficiency being obtained by this method, particularly in the garment industry.

BRIEF DESCRIPTION OF THE DRAWINGS

Other objects, features and advantages of the invention will be understood from the following detailed description of preferred embodiments of the invention, with reference to the drawings, in which.

DETAILED DESCRIPTION OF THE PREFERRED EMBODIMENTS

Figure 1:
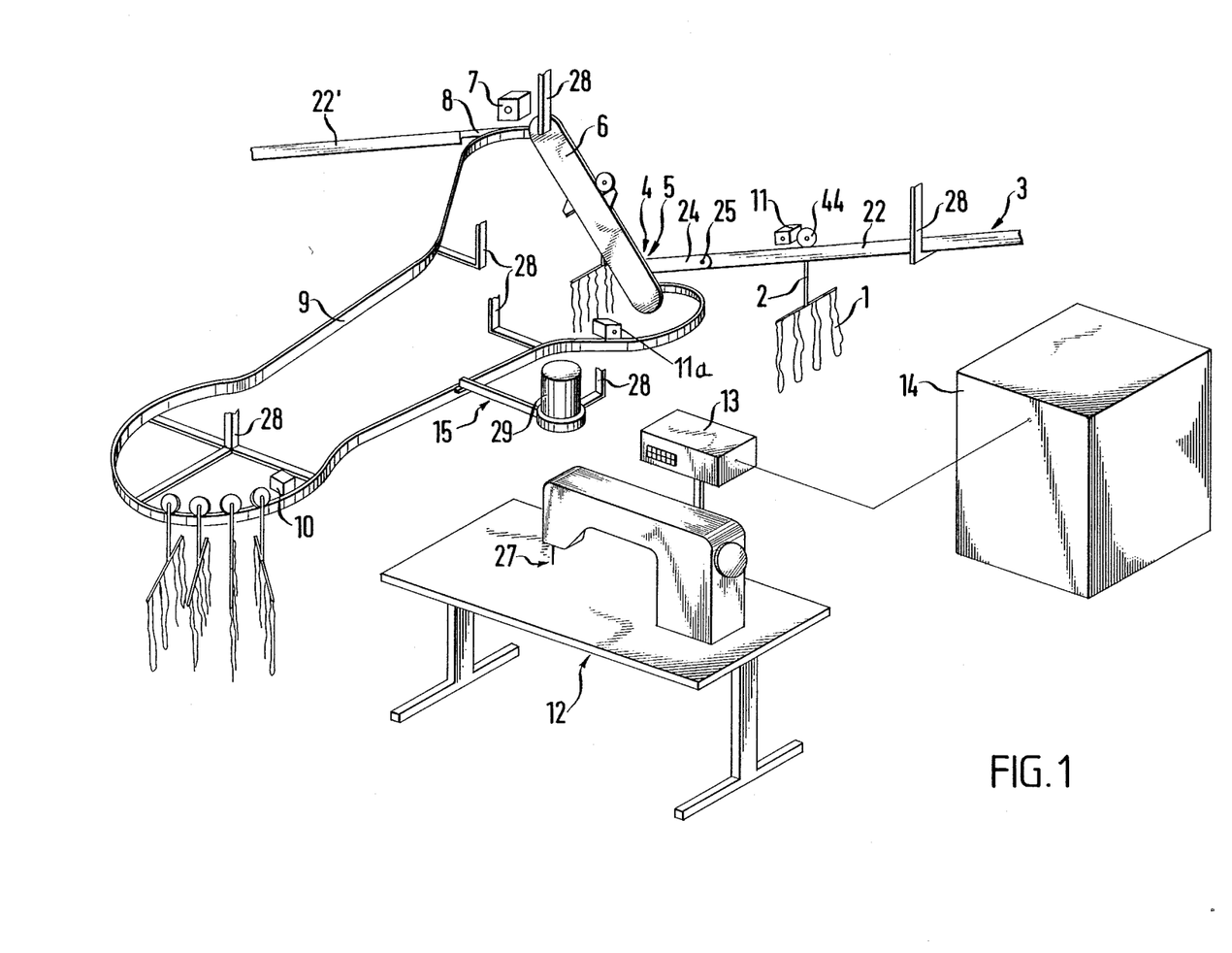
FIG. 1 is a perspective view of a complete workpiece transport system including a work station.
Figure 6:
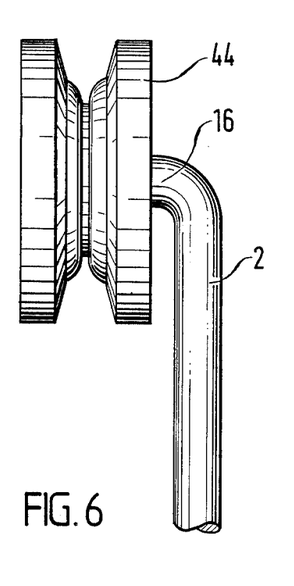
FIG. 6 is a side view of a portion of a load carrier for use with the embodiment of FIG. 1.

FIG. 1 is a perspective view of a complete system, comprising a main path 4, an auxiliary path 9 which branches off from the main path, and a swing-out device 15. The main path 4 includes a suitable downward-sloping carrier rail 22 which has an elevated loading point 3 and a lower end point 5, and an upward-directed drag chain 6 which adjoins said end point and is driven by a controlled electric motor (not shown). A load carrier 2 (shown in part in FIG. 6), which is provided with gripper elements for the detachable gripping of workpieces 1, is raised from a lower level to an upper level by the drag chain 6. The drag chain 6 and load carriers 2 are sufficiently well known that they need not be described in further detail here.

Near its lower end point 5, the carrier rail 22 has a bridge 24 which is swinqable upward around a pivot point 25. In unloaded condition, the bridge 24 rests in such a manner that the upper edges of the carrier rail 22 and of the bridge 24 are aligned. A first holding device 11 is provided between the loading point 3 and the pivot point 25, which accumulates the on-coming load carriers 2 and, at the proper time, releases the accumulated load carriers 2 one at a time. Such a holding device 11 is known in conveyor technology and therefore need not be described in further detail here.

The carrier rail 22, the drag chain 6, the auxiliary path 9, and the swing-out device 15, as well as a buffer station 10 and a holding device 11a (discussed below), are all mounted on a stationary conveyor frame 28 which is merely indicated in FIG. 1. It can have the form of a suspended frame or a standing frame, for example.

Next to the upper end of the drag chain 6, at the starting end of a further carrier rail 22′, is a reading device 7 for recognizing a code, preferably a bar code or another form of automatically detectable code, which is provided on the load carrier 2, preferably on its pulley 44. Arrangements for providing such coding as well as appropriate reading devices are known and need not be described in further detail here.

At the beginning of the further carrier rail 22′ is a switch 8 which can be switched in the horizontal plane, as shown in FIG. 1. Adjacent to the switch 8 is the starting point of an auxiliary path 9. By suitable switching of the switch 8, which can be effected by pressure-actuated means, for instance by a pneumatic cylinder or by a solenoid, a load carrier 2 which has been conveyed upward by the drag chain 6 may be guided onto the auxiliary path 9. In the overall downward-sloping course of the auxiliary path 9, there is first provided a buffer station 10 which can accumulate several oncoming load carriers 2, and at the proper moment release a first stored load carrier 2.

Further along the auxiliary path 9 are a swing-out device 15 and a second holding device 11a. As each load carrier 2 moves along the auxiliary path 9, the horizontal shaft portion 16 of the load carrier 2 moves into position where it may engage the swing-out device 15 by being received in its mouth 18 (see FIG. 4). The lowest point of the auxiliary path 9 discharges below the end point 5 of the carrier rail 22 into the main path 4.

Figure 3:
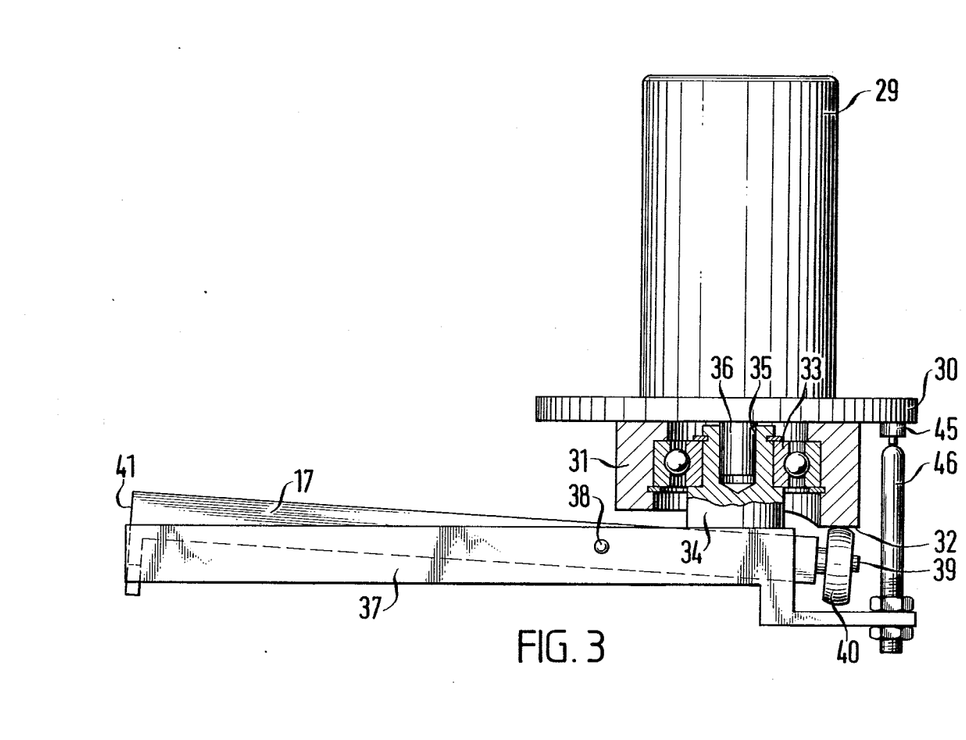
FIG. 3 is a sectional view of the swing-out device of FIG. 1.

The swing-out device 15 (FIG. 3) comprises a controlled electric motor 29 having a plate 30 fastened to its lower flange side. On the bottom of the plate are provided, as shown in FIG. 3, a plurality of switches 45 which correspond to respective positions into which the electric motor 29 can move an extension arm 37. A ring 31 is also firmly attached to the flange side of the electric motor 29. The lower edge of the ring 31 has a cam surface 32. Within its inner bore the ring 31 receives a low-friction bearing, for instance an anti-friction bearing 33. Within the inner ring of the latter there is arranged a bushing 34 which has a central bore 35 provided with a groove. The central bore 35 receives a stub shaft 36 of the electric motor 29 which is locked for rotation with it. Firmly attached to the bushing 34 is the extension arm 37, which is provided with a vertically adjustable switch pin 46. The switches 45 are actuated by the upper rounded end of the switch pin 46.

Figure 4:
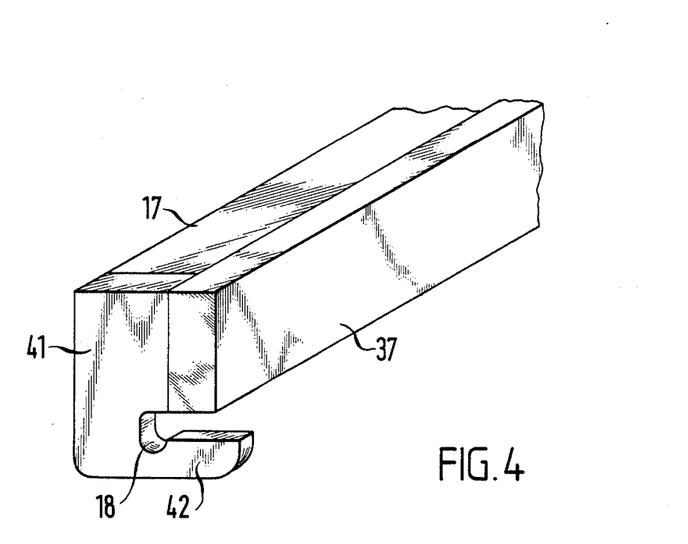
FIG. 4 is a detail of the swing-out device with its mouth open.
Figure 5:
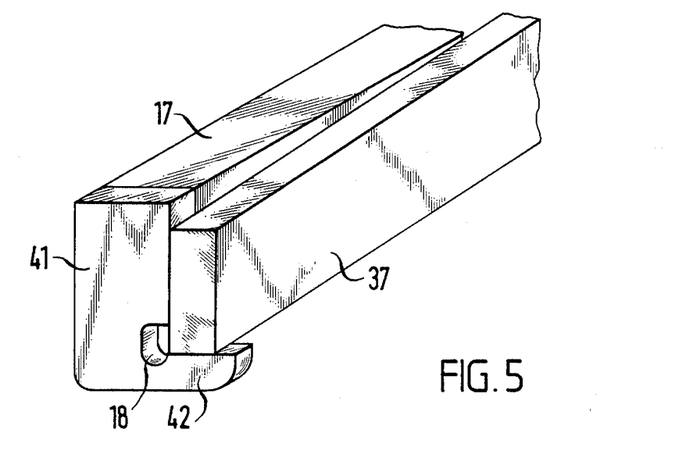
FIG. 5 is a detail of the swing-out device with its mouth closed.

On the extension arm 37 there is a pivot 38, taking the known form of a horizontally arranged pin, which receives a swing arm 17, the latter being constructed as a double-armed lever. At the end of its shorter lever arm is a pin 39 having a roller 40 supported thereon with little friction. On the other end of the swing arm 17 is a hook 41, the lower portion of which forms the mouth 18. The bottom of the hook 41 includes a horizontally protruding nose 42, as shown in FIGS. 4 and 5.

Figure 7:
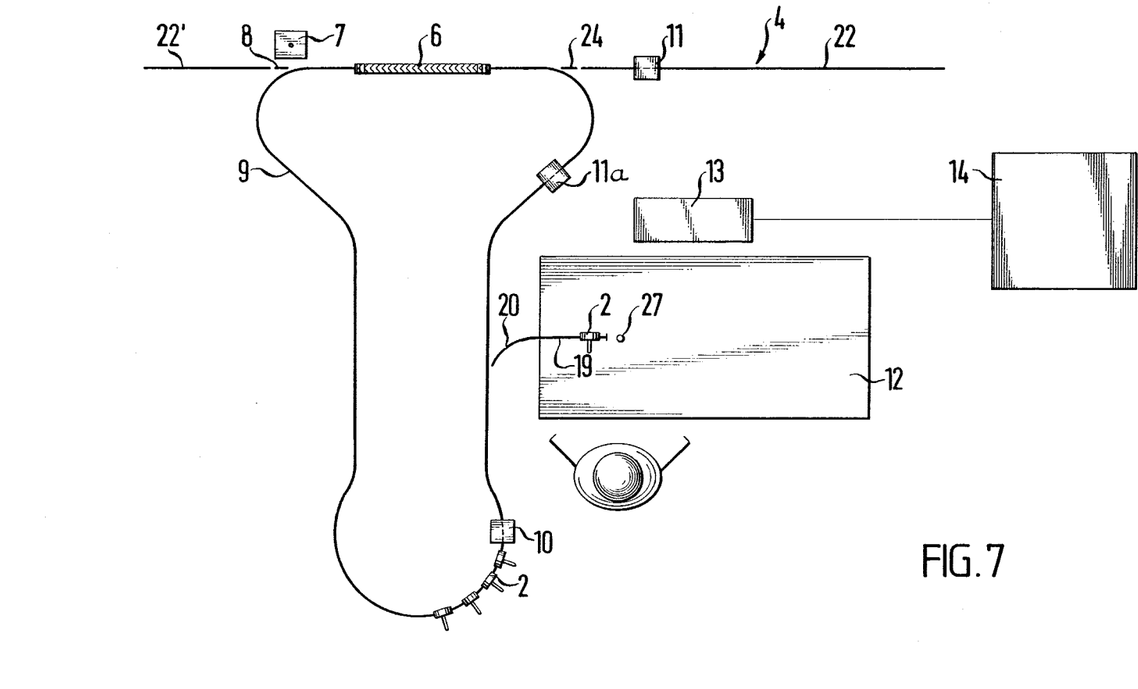
FIG. 7 is a schematic plan view of an alternate embodiment of a complete apparatus having a spur path branching off from the auxiliary path.

A particularly advantageous feature of the invention, as shown in FIG. 7, is that a load carrier 2, after first being stored by the buffer station 10 and then released, may pass via a briefly closed switch 20 into a spur path 19. Then the switch 20 may be opened so that the spur path 19 is no longer functionally connected with the auxiliary path 9, for example for the duration of work on the workpiece 1. After such work, switch 20 is briefly actuated again, and the load carrier 2 is switched back onto the auxiliary path 9.

In order to minimize workpiece transport time around the system, each work station 12 should have means for storing and maintaining a plurality of given variable and fixed data which, to allow for necessary updating, must be able to be continuously supplemented, corrected, expanded and replaced. For this reason, each work station 12 is provided with a workplace computer 13 having an LCD display and several function keys, for example for controlling the forwarding of data or for starting predetermined automatic programs. A plurality of such work-place computers 13 are connected to a host management computer 14 in which, for example, fixed data necessary for the manufacture of a given product, such as product-related and operation-related data as well as customer-specific data, have been embodied in programs and stored. The management computer 14 controls the flow of material to and between the various work stations 12 in accordance with a program set up in this manner. It furthermore evaluates data received via the network of work-place computers 13 and then converts the data, practically without delay, into program-determining control signals.

The manner of operation of the system for minimizing workpiece transport time will now be described.

Code numbers associated with each load carrier 2 are entered into the management computer 14, for instance manually via a keyboard or by the reader 7. Furthermore, a code is placed on each workpiece 1 and is read into the computer 14, for example by a barcode reader or by manual keyboard entry. Following data entry, the course of movement of the load carrier 2 in question is continuously monitored during its manufacturing passage. The data obtained thereby are combined in accordance with predetermined criteria stored along with the programs in the computer 14 and form the basis for a desired flow of material with short passage times.

After entry of its code, each load carrier 2 is first placed at the loading place 3 on the carrier rail 22 and then rolls under the effect of gravity down to the first holding device 11. As each individual load carrier 2 is released from the latter, it rolls over the bridge 24 and down to the end point 5 of the carrier rail 22. Then it is carried by the drag chain 6 to the upper level. In this way, the load carrier 2 arrives at the reading device 7, which reads the code (preferably provided on the pulley 44) and transmits it to the management computer 14 together with the instantaneous position of the load carrier 2.

If, on the basis of the program which has been introduced, the management computer 14 determines that the load carrier 2 is to be brought to the work station 12 which lies closest to its instantaneous location, then the switch 8 is actuated to bring the load carrier 2 onto the auxiliary path 9, as shown in FIG. 1. It then rolls by gravity down to the buffer station 10 where it may be held. When the latter buffer 10 releases a stored load carrier 2, it rolls on the auxiliary path 9 until the horizontal shaft portion 16 of the load carrier 2 is caught by the mouth 18 of the swing-out device 15. The extension arm 37 is now swung through a defined angle, causing the roller 40, at the start of this swing, to rise on the raised portion of the cam surface 32. As a result of this, the swing arm 17 is swung in a clockwise direction as shown in FIG. 3, lifting the load carrier 2. In this way, at the very start of the swinging of the extension arm 37, the corresponding load carrier 2 is lifted off the auxiliary path 9. Since the mouth 18 is closed by the swinging of the swing arm 17, as shown in FIG. 5, the load carrier 2, as long as it is outside the auxiliary path 9, cannot be removed from the swing arm 17.

Figure 2:
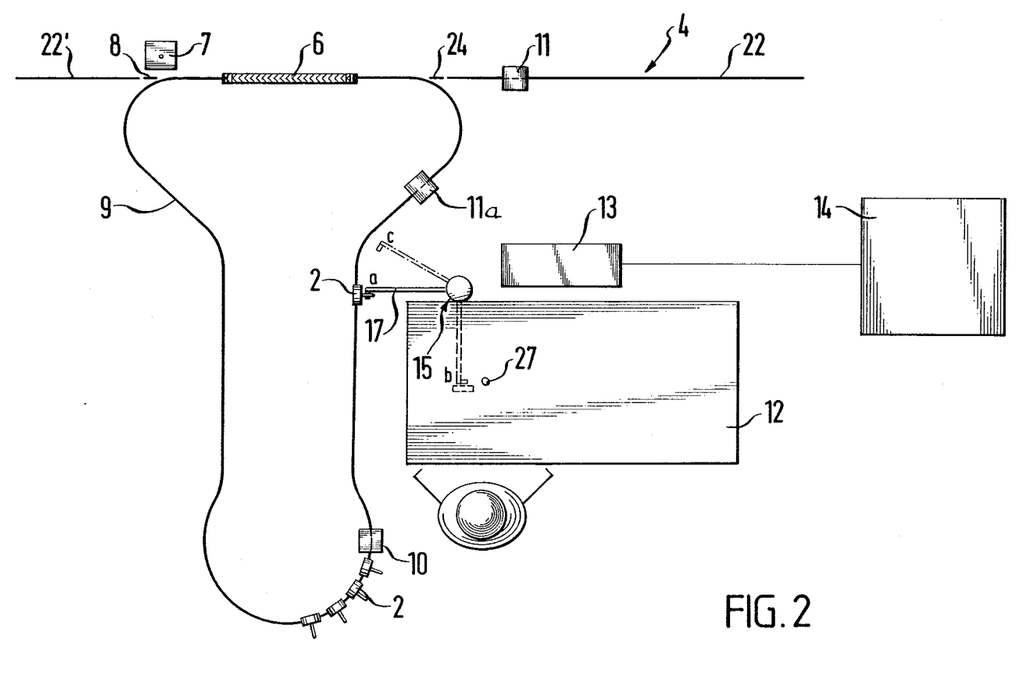
FIG. 2 is a schematic plan view corresponding to FIG. 1 and showing movement of the swing-out device.

Then the swing-out device passes through an angle of rotation, for example 90 degrees, to bring the load carrier 2 and the workpiece 1 attached to it into the immediate vicinity of the work center 27 of the work station 12. (See position "b" in FIG. 2.)

As long as the load carrier in question is outside the auxiliary path 9, the sorting or recirculation of any other load carriers 2 on the auxiliary path 9 can continue, assuring, for example, that at least one similar workpiece 1 will be ready for the next work procedure at the work station 12.

After completion of the work, the extension 37 is again swung back to replace the load carrier 2 on the auxiliary path 9. The extension arm 37 is then swung up into the position "c" shown in FIG. 2, so as to permit the unimpeded passage of the just-replaced load carrier 2 along the auxiliary path 9. When the load carrier 2 has passed position "c", then the extension 37 moves back again into its initial position "a".

The load carrier 2 then rolls down to the second holding device 11a. When the latter releases the load carrier 2, it rolls to the end of the auxiliary path 9, the bridge 24 being moved upward and out of the way by the pulley 44 of the load carrier. The load carrier 2 is thus conveyed to the drag chain 6 for being conveyed upward, while the bridge 24, after being released by the pulley 44, again assumes its lower position, shown in FIG. 1.

Then the load carrier 2, having arrived at the upper level, thus arrives for the second time at the reader device 7 which again reads its code. In this way, for example, a time credit slip or other record corresponding to the operation just carried out may be produced for the operator in question.

If, in accordance with the program stored in the management computer 14, further operations are to be effected on the workpiece 1 that has just been worked upon and whose identification code has been read at the work station 12, the load carrier 2 thereof may be conducted onto the further carrier rail 22', and pass via a drag chain 1', and over an auxiliary path 9' to another work station 12' (not shown).

From the above description it is clear that a large number of different work stations 12 can be reached from the main path 4 in a very rational and efficient manner via auxiliary paths 9 branching off from it. In addition to the shortening of workpiece passage times, the method of the invention, due to the modular construction of the apparatus required, is very flexible since the apparatus can be adapted for either manufacturing or space requirements—even in the event of subsequent changes—in a relatively simple manner, and is capable of expansion at any time.

Although the present invention has been described in connection with preferred embodiments thereof, other variations and modifications may occur to those skilled in the art. It is to be understood, therefore, that the present invention is limited not by the specific disclosure herein, but only by the claims.

What is claimed is:

1. Apparatus for transporting load carriers for carrying respective workpieces, the apparatus comprising:
    (a) a main path including:
        (i) at least one carrier rail for receiving such load carriers at a loading point thereof and transporting such load carriers to a lower level of said main path; and
        (ii) lift means for receiving such load carriers at said lower level and lifting same to an upper level of said main path;
    (b) an auxiliary path for transporting such load carriers from said upper level to said lower level of said main path;
    (c) identifying means adjacent said upper level for identifying load carriers at said upper level and generating load carrier identification data;
    (d) control means for receiving such load carrier identification data and also receiving data relative to the respective workpieces carried on each such load carrier and work to be performed on such workpieces, and determining a path to be followed by each such loads carrier for performing such work; said control means controlling:
    (e) switch means for selectively switching load carriers from said upper level of said main path onto said auxiliary path;
    (f) diverting means on said auxiliary path downstream from said switch means for selectively termporarily diverting load carriers to a work station, and then returning them to said auxiliary path; and
    (g) means on said auxiliary path downstream from said diverting means for transferring such load carriers from the end of said auxiliary path to said lift means at said lower level of said main path, thereby maintaining circulation around said auxiliary path of load carriers that are not temporarily diverted to said work station.

2. Apparatus as in claim 1, wherein said diverting means includes a spur path branching from said auxiliary path, load carriers being selectively passed to said spur path by a spur switch controlled by said control means.

3. Apparatus as in claim 1, wherein said carrier rail and said auxiliary path slope downward for transporting such load carriers thereon by gravity.

4. Apparatus as in claim 1, wherein said carrier rail includes a bridge portion adjacent said lower level, said bridge portion having a downward position for transporting load carriers from said carrier rail to said lower level of said main path; and an upward position in which said bridge is pivoted upward by laod carriers transported to said lower level by said auxiliary path for permitting such load carriers to be received by said lift means.

5. Apparatus as in claim 4, further comprising upper holding means adjacent a portion of said carrier rail between said loading point and said bridge, for accumulating load carriers received on said carrier rail and selectively releasing them under control of said control means.

6. Apparatus for transporting load carriers for carrying respective workpieces, the apparatus comprising:
(a) a main path including:
(i) at least one carrier rail for receiving such load carriers at a loading point thereof and transporting such load carriers to a lower level of said main path; and
(ii) lift means for receiving such load carriers at said lower level and lifting same to an upper level of said main path;
(b) an auxiliary path for transporting such load carriers from said upper level to said lower level of said main path;
(c) identifying means adjacent said upper level for identifying load carriers at said upper level and generating load carrier identification data;
(d) control means for receiving such load carrier identification data and also receiving data relative to the respective workpieces carried on each such load carrier and work to be performed on such workpieces, and determining a path to be followed by each such load carrier for performing such work; said control means controlling:
(e) switch means for selectively switching load carriers from said upper level of said main path onto said auxiliary path;
(f) buffer means on said auxiliary path downstream from said switch means for accumulating load carriers switched onto said auxiliary path and then selectively releasing them;
(g) diverting means on said auxiliary path downstream from said buffer means for selectively diverting load carriers released by said buffer means to a work station, and returning them to said auxiliary path; and
(h) lower holding means on said auxiliary path downstream from said diverting means for accumulating load carriers received from upstream therefrom, and selectively releasing such load carriers to pass to the end of said auxiliary path at said lower level of said main path;
wherein said diverting means includes a swing-out device mounted adjacent said auxiliary path and comprising:
(a) a motor controlled by said control means and having a fixed cam surface connected thereto;
(b) an extension arm having a near end linked to said motor means for being rotated thereby into a plurality of positions, a far end of said extension arm being adjacent said auxiliary path when said extension arm is in a first such position;
(c) a swing arm pivotally mounted on a point on said extension arm intermediate said near and far ends and parallel to said extension arm, said swing arm having
(i) a far end with mouth means thereon for engaging a load carrier on said auxiliary path when said extension arm is in said first position, and
(ii) a near end which engages said cam surface when said extension arm is out of said first position for pivoting said swing arm so as to close said mouth means and thereby retain such load carrier in said mouth means while lifting it off said auxiliary path.

7. Apparatus as in claim 6, wherein said near end of said swing arm has a roller mounted thereon for engaging said cam surface.

8. Apparatus as in claim 6, wherein said mouth means comprises a hook which coacts with said far end of said extension arm for retaining such load carrier in said mouth means when said extension arm is out of said first position.

9. Apparatus as in claim 6, wherein said motor has a ring fixed to a bottom portion thereof, a lower edge of said ring comprising said cam surface, and within said ring is a bushing fixed to said extension arm and rotatably engaging a downwardly-directed stub shaft of said motor, said bushing being mounted on said bottom portion of said motor for rotation with said extension arm.

10. Apparatus as in claim 1, wherein said lift means comprises a drag chain.

11. A method of transporting workpieces comprising the steps of:
(a) placing each such workpiece on a load carrier;
(b) palcfing an identifier on each load carrier and each workpiece;
(c) loading a central computer with data relative to each given workpiece, its respective load carrier, and work to be performed on such workpiece;
(d) programming the central computer to cause it to predetermine a path to be followed by such load carrier;
(e) placing such load carrier on a main path;
(f) reading the identifier on such load carrier, generating load carrier identification data and transmitting same to the central computer;
(g) in response to said load carrier identification data and said predetermined path, determining whether such load carrier is to be diverted from the main path to circulate on an auxiliary path, and if so, throwing a switch for so diverting such load carrier onto said auxiliary path, and then temporarily diverting such load carrier from said auxiliary path and to a work station under control of the central computer for performing work on such given workpiece;
(h) after performing such work on such given workpiece, returning such load carrier to the auxiliary path under control of the central computer;
(i) reading the identifier on such workpiece; generating workpiece identification data and transmitting same to the central computer;
(j) returning said load carrier to said main path from said auxiliary path and again reading said load carrier identifier, to determine whether such load carrier is to be again diverted from said main path to an auxiliary path for performing further work on a workpiece carried thereon.

12. A method as in claim 11, further comprising the steps of:
(a) placing such load carrier on a carrier rail of said main path;
(b) retaining such load carrier on said carrier rail and then releasing it by means of an upper holding device controlled by the central computer, for permitting it to pass to a lower level of said main path;
(c) lifting such load carrier to an upper level of said main path, where its identifier is read and such load carrier identification data is generated.

13. A method as in claim 11, further comprising the steps of:

(a) retaining such load carrier on said auxiliary path and then releasing it by means of a buffer device controlled by the central computer; and then (b) retaining such load carrier on said auxiliary path and then releasing it by means of a lower holding device controlled by the central computer.

14. A method of transporting workpieces comprising the steps of:
(a) placing each such workpiece on a load carrier;
(b) placing an identifier on each load carrier and each workpiece;
(c) loading a central computer with data relative to each given workpiece, its respective load carrier, and work to be performed on such workpiece;
(d) programming the central computer to cause it to predetermine a path to be followed by such load carrier;
(e) placing such load carrier on a main path;
(f) reading the identifier on such load carrier, generating load carrier identification data and transmitting same to the central computer;
(g) in response to said load carrier identification data and said predetermined path, determining wehther such load carrier is to be diverted from the main path to an auxiliary path, and if so, throwing a switch for so diverting such load carrier onto said auxiliary path;
(h) retaining such load carrier on said auxiliary path and then releasing it by means of a buffer device controlled by the central computer;
(i) diverting such load carrier from said auxiliary path and to a work center of the work station under control of the central computer;
(j) after performing such work on such given workpiece, returning such load carrier to the auxiliary path under control of the central computer; and then
(k) retaining such load carrier on said auxiliary path and then releasing it by means of a lower holding device controlled by the central computer;
(l) reading the identifier on such workpiece, generating workpiece identification data and transmitting same to the central computer;
(m) returning said load carrier to said main path from said auxiliary path and again reading said load carrier identifier, to determine whether such load carrier is to be again diverted from said main path to an auxiliary path for performing further work on a workpiece carried thereon;
further comprising the steps of:
(n) providing a swing-out device controlled by the central computer and having a mouth adapted for simultaneously engaging and lifting a portion of a load carrier that is present on said auxiliary path; and
(o) diverting such load carrier to said work center by means of the swing-out device.

15. A method as in claim 13, further comprising the steps of:
(a) providing a spur path branching off the auxiliary path and to the work center; and
(b) diverting such load carrier from the auxiliary path and to said work center by throwing a switch which interconnects said auxiliary path and said spur path.

16. A method of accelerating the processing time of an automatic manufacturing operation, comprising the steps of:
providing a stream of raw materials which comprises a plurality of carriers which carry workpieces;
placing machine-readable codes on said carriers;
moving said carriers along a main track;
diverting a selected plurality of such coded carriers from said main track to an auxiliary track in response to the codes thereon;
moving said carriers in circulation on said auxiliary track;
temporarily diverting one selected carrier in response to the code thereon, from the auxiliary track to a predetermined processing point at a work station, while the non-selected carriers on said auxiliary track continue to move in said circulation, past said diverted carrier;
subsequently replacing said diverted carrier on the auxiliary track after processing of said workpiece at said work station; and
returning said selected plurality of carriers from said auxiliary track to said main track in response to the codes thereon.

17. Apparatus as in claim 1, further comprising buffer means on said auxiliary path downstream from said switch means for accumulating load carriers switched onto said auxiliary path and then selectively releasing them, said buffer means being upstream from said diverting means, said diverting means selectively diverting load carriers released by said buffer means.

18. Apparatus as in claim 1, further comprising lower holding means on said auxiliary path downstream from said diverting means, for accumulating load carriers received from upstream therefrom, and seleotively releasing such load carriers to pass to the end of the auxiliary path at said lower level of said main path.

19. Apparatus as in claim 1, wherein said diverting means comprises a pivoting mechanism adjacent said auxiliary path and said work station, said pivoting mechanism having a boom with jaws on one end thereof, configured and disposed for engaging load carriers on said auxiliary path, and pivoting to divert said load carriers to said work station.

20. Apparatus as in claim 1, whrein said diverting means includes a swing-out device mounted adjacent said auxiliary path and comprising:
(a) a motor controlled by said control means and having a fixed cam surface connected thereto;
(b) an extension arm having a near end linked to said motor means for being rotated thereby into a plurality of positions, a far end extension arm being adjacent said auxiliary path when said extension arm is in a first such position;
(c) a swing arm pivotally mounted on a point on said extension arm intermediate said near and far ends and parallel to said extension arm, said swing arm having
  (i) a far end with mouth means thereon for engaging a load carrier on said auxiliary path when said extension arm is in said first position, and
  (ii) a near end which engages said cam surface when said extension arm is out of said first position for pivoting said swing arm so as to close said mouth means and thereby retain such load carrier in said mouth means while lifting it off said auxiliary path.

21. Apparatus as in claim 20, wherein said near end of said swing arm has a roller mounted thereon for engaging said cam surface.

22. Apparatus as in claim 20, wherein said moth means comprises a hook which coacts with said far end of said extension arm for retaining such load carrier in said jaw means when said extension arm is out of said first position.

23. Apparatus as in claim 20, wherein said motor has a ring fixed to a bottom portion thereof, a lower edge of said ring comprising said cam surface, and within said ring is a bushing fixed to said extension arm and rotatably engaging a downwardly-directed stub shaft of said motor, said bushing being mounted on said bottom portion of said motor for rotation with said extension arm.

* * * * *